J. H. HARTWELL.

Evaportor for Saccharine Juices.

No. 37,911. Patented March 17, 1863.

UNITED STATES PATENT OFFICE.

JAMES H. HARTWELL, OF JEFFERSON COUNTY, INDIANA.

IMPROVED EVAPORATOR FOR SACCHARINE LIQUIDS.

Specification forming part of Letters Patent No. 37,911, dated March 17, 1863.

*To all whom it may concern:*

Be it known that I, JAMES H. HARTWELL, of the county of Jefferson and State of Indiana, have invented a new and useful improvement on Cook's sugar-evaporator used for manufacturing sugar and molasses out of the juice of the Chinese sugar-cane; and I do hereby declare that the following is a full, clear, and exect description of the construction and operation of the same, reference being had to the annexed drawings, making a part of this specification, in which—

Figure 1:
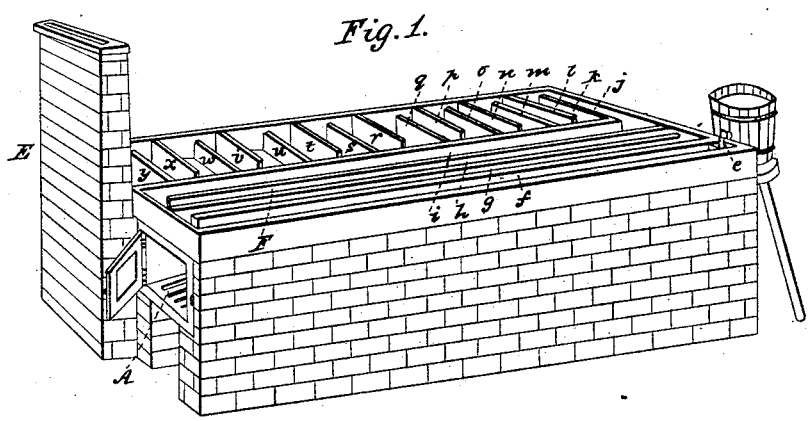
Figure 2:
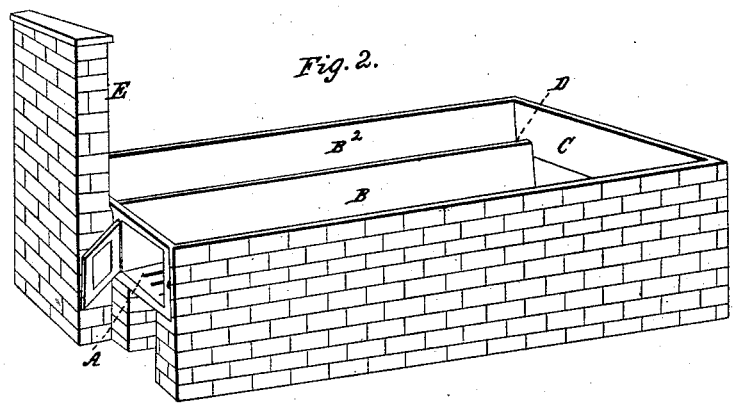

Figure 1 is a perspective view of the entire machine, and Fig. 2 a perspective view of the furnace attached.

In Fig. 2, letter A represents the fire-place; B B², the flues under the boiling-pan; D, the partition-wall between the two flues B B²; C, the flue connecting the two flues B B², situated at the back part of the furnace, and E the chimney.

In Fig. 1, letter F represents the entire boiling-pan; $e$, the strainer through which the juice is admitted into the pan, and letters $f$ $g$ $h$ $i$ $j$ $k$ $l$ $m$ $n$ $o$ $p$ $q$ $r$ $s$ $t$ $u$ $v$ $w$ $x$ $y$ the several ledges running through the pan, forming the different longitudinal and transverse currents.

The fire is kindled and maintained in the furnace at letter A. The heat and smoke pass under the part of the pan which is divided by ledges, so as to form transverse longitudinal currents along the flue B to flue C, through flue C to flue B², and thence through the chimney E. The juice of the cane is admitted into the pan through the sieve or strainer $e$ into the canal formed by the side of the pan and ledge $f$, down that canal to the end of the pan immediately over the fire-place, thence through the duct formed by the end of the pan and the termination of ledge $f$ into the canal formed by ledges $f$ and $g$, thence up said canal to the other end of the pan, thence through a duct similarly formed, as before, by the termination of ledge $g$ and the end of the pan into the canal formed by ledges $g$ and $h$, down said canal to the end of the pan immediately over the fire-place, then through a duct to canal formed by ledges $h$ and $i$ to the back part of the pan, and communicates with the transverse current formed by end of pan $j$ and ledge $k$, and thus through all the transverse canals formed by ledges $k$, $l$, $m$, $n$, $o$, $p$, $q$, $r$, $s$, $t$, $u$, $v$, $w$, $x$, and $y$ to a cock at outside corner of pan.

My invention has the following advantages over Cook's evaporator and all others known to me, viz:

First. By the strainer $e$, Fig. 1, made of fine wire or cloth, I exclude all extraneous substances from the pan and prevent the accumulation of that fine starchy substance incident to manufacturing by all other evaporators.

Second. In Cook's evaporator and all others known to me, the furnace being but about eight feet long, the greatest degree of heat is applied where the thickened sirup is boiling, thereby endangering it to burning or scorching. By my partition of the furnace and boiling-pan I have a strong heat applied while passing through the longitudinal canals and through the first few of the transverse canals, and by this time the sirup begins to thicken and to require a moderate heat, and by the admirable arrangement of my furnace by this time the heat begins to be somewhat exhausted and most admirably adapted to the condition of the sirup above, and by this means I can boil the sirup until it becomes very thick without the least danger of burning.

Third. By means of my transverse flues I exhaust a great amount of heat in the manufacture of sugar and molasses that by all other methods of evaporation escapes up the chimney, thereby saving about one-third of the fuel necessary for other evaporators.

In my system of evaporation I use the same system of continuous moving currents used by Cook and others in their evaporators, and for which I do not claim originality.

The bottom of my pan and ledges is formed of galvanized iron, and the furnace of any good building material.

The flow is regulated by the admission of a greater or less quantity of the juice through the sieve, according to circumstances, as in other evaporators formed on this system.

The ledges in my pan are ten inches high, which prevents the sirup from boiling over from one canal to another.

Having thus fully described my invention, what I claim as new, and desire to secure by Letters Patent of the United States, is—

1. The divided pan F, in combination with a furnace, also divided, as shown, both arranged and operating substantially as described, and for the purpose set forth.

2. The pan F, composed of a longitudinally and a horizontally divided portion, for the purpose set forth.

3. The strainer E, in combination with the double pan F and divided furnace, the whole to form an improved evaporator, as and for the purpose described.

JAMES H. HARTWELL.

Witnesses:
A. D. MATTHEWS,
ANTON HOAG.